March 29, 1960 R. G. KNUDSEN ET AL 2,930,136
LINKAGE GAUGE FOR AUTOMATIC TRANSMISSIONS AND THE LIKE
Filed June 22, 1955 3 Sheets-Sheet 1

INVENTORS
RAYMOND G. KNUDSEN
FLOYD W. PRESLAN
BY
ATTORNEY

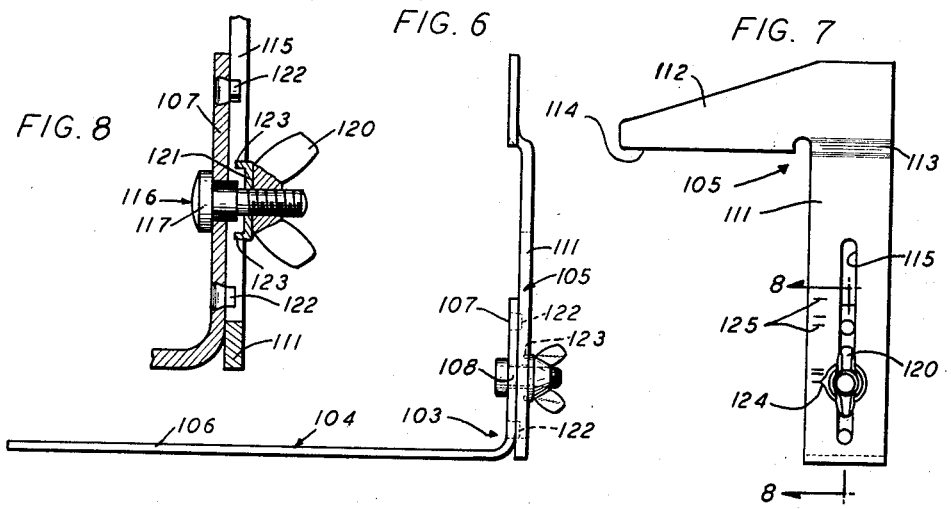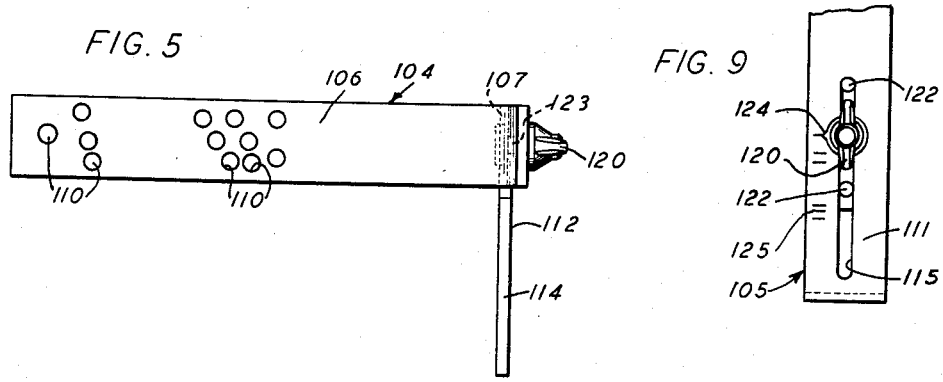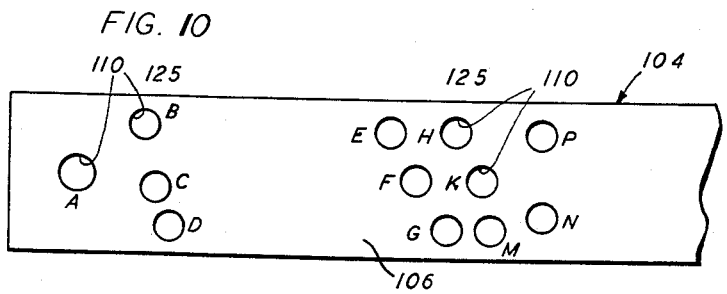

March 29, 1960  R. G. KNUDSEN ET AL  2,930,136
LINKAGE GAUGE FOR AUTOMATIC TRANSMISSIONS AND THE LIKE
Filed June 22, 1955  3 Sheets-Sheet 3

INVENTORS
RAYMOND G. KNUDSEN
FLOYD W. PRESLAN
BY Harry C. Bierite

ATTORNEY

United States Patent Office 2,930,136
Patented Mar. 29, 1960

2,930,136

LINKAGE GAUGE FOR AUTOMATIC TRANSMISSIONS AND THE LIKE

Raymond G. Knudsen and Floyd W. Preslan, Kenosha, Wis., assignors to Snap-on Tools Corporation, Kenosha, Wis., a corporation of Delaware Application June 22, 1955, Serial No. 517,146

13 Claims. (Cl. 33—181)

The present invention relates to measuring instruments and more particularly to a gauge mechanism designed primarily for use in connection with the installation of throttle levels associated with automatic automotive transmissions in the general transmission assembly in such a manner that the lever will initially assume a predetermined position of orientation with respect to the transmission casing.

In automobile assumbly operations, as well as in the overhauling of automotive transmissions, it is essential for proper operation of the transmission that the linkage system associated with the transmission be properly adjusted. It has been estimated that approximately 80% of all malfunctions of automatic transmissions, particularly combination fluid-gear automatic transmissions, are due to improper throttle valve linkage adjustment. This throttle valve linkage extends between the throttle valve and the accelerator pedal of the vehicle so that the valve will regulate on oil pressure that varies with accelerator opening. When accelerating slowly, the accelerator pedal is depressed only slightly so that the shifts occur at low vehicle speed. When accelerating rapidly, the accelerator pedal is depressed almost all or all of the way open so that the shifts do not take place until a higher vehicle speed is attained. Downshift of the transmission may be obtained when driving at a relative high gear ratio by exerting additional pressure of the accelerator pedal and this operates through the linkage mechanism to allow the throttle valve to move past its normal open position to open up an oil line which forces certain shifter valves closed and puts the transmission in a lower gear ratio in a manner well known in the transmission art.

It is obvious therefore that not only must the various elements of the throttle valve linkage system be of the proper predetermined length, but each link element of the system must also impart to the adjacent link element or elements the proper degree of "throw" within very fine tolerances so that the ultimate throw of the throttle valve lever proper will actuate the valve in the desired manner to initiate a transmission up shift or down shift, as the case may be, at the desired vehicle speed.

Since the various linkage elements of automatic transmissions of this character ordinarily are constructed so as to be of predetermined effective lengths, installation of the linkage system is merely a matter of properly connecting the elements together as well as connecting them to the accelerator pedal and throttle valve shaft respectively. However, when the component elements of the system are thus connected, it is essential that the throttle valve shaft assume a predetermined position of angularity with respect to a fixed reference point, usually a point selected with respect to the transmission casing which may be regarded as being fixed. The proper setting for the throttle valve shaft is a function of the initial position of the throttle lever to which it is fixedly attached and therefore in installing the linkage system it is merely necessary to bring the throttle lever to a predetermined position of orientation with respect to a reference point on the transmission casing and then tighten the same on the throttle valve shaft.

Heretofore installation mechanics, following factory recommendations, have, with certain types of automatic transmissions, selected as a reference point one of the cover screw openings in the transmission casing as the fixed reference point and, utilizing a solid one-piece gauge member having a pin at each end, inserted one pin in the screw opening and the other in the throttle valve lever pivot opening, thus establishing a definite and fixed position for the lever before tightening the same on the valve shaft. This has necessitated removal of the fastening screw from the reference opening. When adjustments are made with the transmission already installed in the vehicle it frequently happens that removal of the cover fastening screw is impossible and other makeshift operations of doubtful effectiveness or trial and error methods must be resorted to. Additionally, the recommended distances between the axis of the transmission casing opening and the pivot opening of the lever will vary for different vehicle models even though the transmission may remain the same. This has necessitated the use of different gauge members with the attendant disadvantages of storage facilities and proper gauge selection by the mechanic.

Other types of automatic transmissions are susceptible to throttle valve linkage installation or adjustment utilizing a fixed reference line such as one edge of the transmission cover pan side flange. With transmissions of this type variations in the location of the pivotal axis of the throttle lever with respect to the cover pan side flange as well as variations in the distances between the planes of the lever and flange respectively may require the design and use of a large variety of separate gauging devices. At the present time at least eight leading manufacturers of automotive vehicles utilizing this type of automatic transmission will require different specially designed gauging devices for each make of vehicle and for each body style and the gauging device requirements will vary even according to the year of manufacture. To accommodate all of these types of automotive transmissions and vehicles it is necessary to keep at hand as many as fifty or more different gauging devices. The present invention is designed to overcome the above noted limitations that are attendant upon present day methods of effecting throttle lever linkage installation in automatic transmissions and, toward this end, the invention in one form thereof contemplates the provision of a relatively simple two-piece gauge assembly which is capable of adjustment to accommodate a large variety of installations.

The provision of a gauge assembly of this character being among the principal objects of the invention, another and important object is to provide such an assembly which may be put to use during linkage assembly operations without necessitating unfastening any portion or element of the transmission.

It is a further object of the invention, in another form thereof, to provide such a gauge assembly which with but few exceptions is capable of universal use in connection with a large variety of automotive transmissions as used in connection with various makes and models of automotive vehicles and which is capable of adjustment to accommodate the particular spacing between the respective planes of the throttle valve lever and of the reference flange on the transmission cover pan and which also is capable of selective adaptation to transmissions having throttle valve levers of different lengths, of different "throw" characteristics and of different transverse spacing with reference to the rear surface of the transmission.

The provision of a linkage gauge mechanism for facilitating throttle valve linkage installation or adjustment which is extremely simple in its construction; one which is comprised of but two parts capable of being adjustably clamped together in various selected positions; one which in many instances may be used on transmissions of differing characteristics without requiring any change in adjustment whatsoever; one which may be manipulated with facility; one which requires no mathematical calculations for the necessary adjustments thereof; one which is rugged and durable and which therefore is unlikely to get out of order, and one which otherwise is well adapted to perform the services required of it are further desirable features that have been borne in mind in the production and development of the present invention.

In the accompanying three sheets of drawings forming a part of this specification, two embodiments of the invention have been shown.

In these drawings:

Fig. 5 is a plan view of a modified form of linkage gauge adjusting mechanism constructed in accordance with the principles of the present invention.

Fig. 6 is a side elevational view of the structure shown in Fig. 5.

Fig. 7 is an end view of the mechanism of Figs. 5 and 6.

Fig. 8 is a sectional view taken substantially along the line 8—8 of Fig. 7.

Fig. 9 is a fragmentary view of a portion of the structure shown in Fig. 7 with the parts in a different adjusted position.

Fig. 10 is an enlarged fragmentary view of a portion of the structure shown in Fig. 5, the enlargement being made to accommodate certain legending employed to facilitate the use of the mechanism.

The structure selected for illustration is not intended to serve as a limitation upon the scope of the teachings of the invention, but is merely illustrative thereof. There may be considerable variations and adaptations of all or part of the teachings depending upon dictates of commercial practice.

Figure 4:
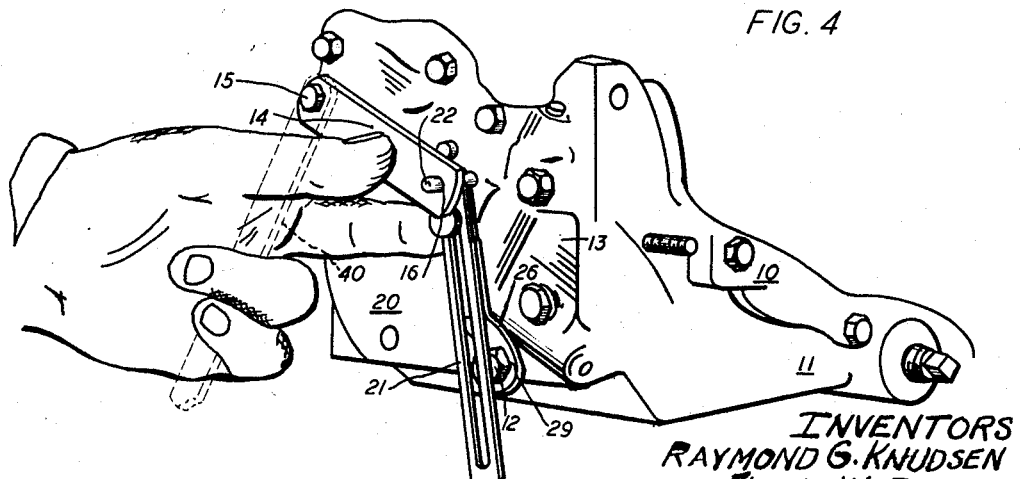
Fig. 4 is a perspective view of a portion of an automotive transmission showing the mechanism of Figs. 1 to 3 inclusive operatively applied thereto for throttle linkage adjusting purposes.
Figure 11:
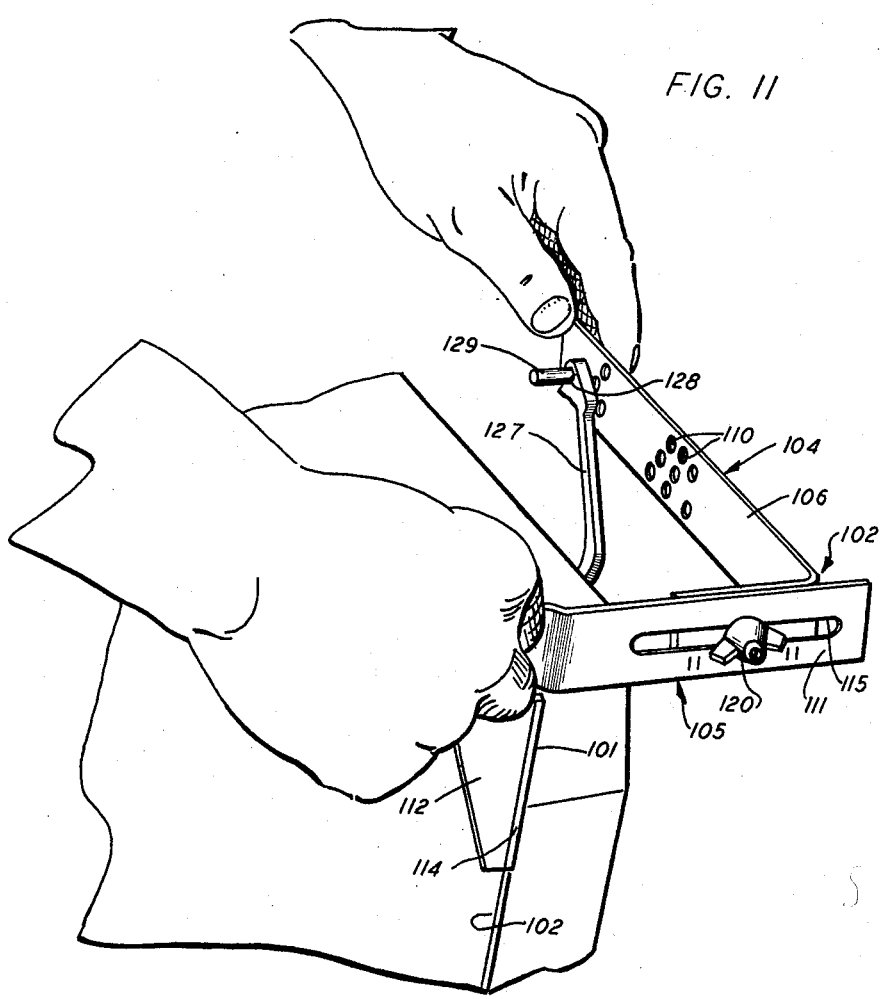
Fig. 11 is a perspective view similar to Fig. 4 showing the mechanism of Figs. 5 to 10 inclusive operatively applied to a different type of automatic transmission.

Referring now to the drawings in detail and in particular to Fig. 4 wherein one embodiment of the invention has been shown as being operatively applied to a transmission assembly for the purpose of adjusting the throttle lever thereof, a fragment of the transmission assembly is shown in dotted lines and is designated in its entirety at 10. This assembly includes the usual dished housing 11 to which there is secured by means of a series of studs 12, a cover plate 13. The transmission throttle valve lever 14 is adapted to be secured to the throttle valve rock-shaft (not shown) in a selected position of angular adjustment thereon by means of a fastening screw 15. The free end of the lever 14 is formed with an opening 16 therein by means of which the same is operatively connected to an adjacent element of the accelerator pedal linkage system (not shown) and which opening is employed for gauging purposes in a manner that will be made clear presently.

For proper operation of the transmission it is necessary that the throttle valve lever 14 be set at a predetermined angle radially on the throttle valve rockshaft and the desired setting for the lever may be made by utilizing the transmission casing for reference purposes. Accordingly, the center or axis of one of the cover plate fastening screws 12 and particularly the lowermost screw 12 may be selected as a reference axis and, when the throttle lever 14 has been rotated about the axis of the shaft on which it is mounted until the center of the opening 16 in the end thereof is spaced from the reference axis a particular selected distance, then the angle of the lever with respect to a line connecting the reference axis and shaft can assume but one value and the lever may assume either one of two definite and fixed positions. One of these positions may be regarded as a negative value and may be disregarded as being incorrect for installation purposes while the other position, as shown in Fig. 4, will be the proper setting for the lever.

Figure 1:
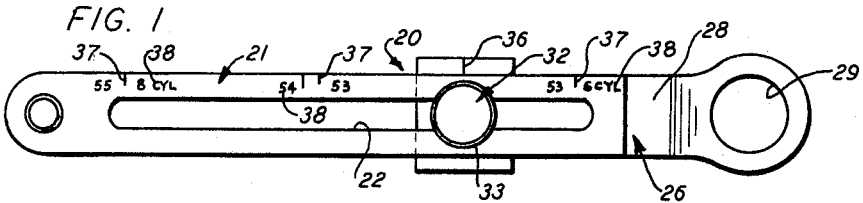
Fig. 1 is a plan view of one form of linkage gauge adjusting mechanism constructed in accordance with the principles of the present invention.
Figure 2:
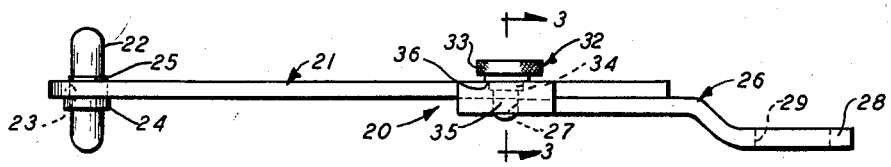
Fig. 2 is a side elevational view of the structure shown in Fig. 1.
Figure 3:
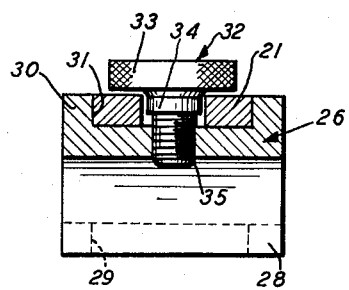
Fig. 3 is an enlarged sectional view taken substantially along the line 3—3 of Fig. 2.

According to the present invention and in order to bring the center of the opening 16 in the lever 14 to the required fixed distance from the axis of the stud 12a, a gauging device designated in its entirety at 20 is provided and is illustrated in detail in Figs. 1 to 3 inclusive. The gauging device 20 is comprised of two main parts or elements, one element 21 being in the form of an elongated bar having a relatively long straight sided longitudinal slot 22 formed therein. One end of the bar 21 carries thereon a double ended pin 22 which passes through an opening 23 formed in the bar and which is secured in position in the opening by a flange 24 on one side of the opening and by a staked bead 25 on the other side thereof. The two sections of the pin project outwardly from the two faces of the bar 21 in opposite directions. The opposite ends of the pin 22 are preferably rounded as shown to facilitate insertion of either section into the throttle lever opening 16.

The other main element 26 of the gauging device is likewise in the form of an elongated bar having a threaded opening 27 formed therein adjacent one end and having a laterally offset portion 28 at the other end. The offset portion 28 is provided with a circular hole 29 therethrough the diameter of which is substantially equal to the overall diameter of the stud 12a (Fig. 4) which has been selected as a reference element for proper gauging of the throttle lever 14 as previously described. The end of the bar 26 through which the threaded opening 27 is formed is provided with a pair of upstanding side flanges 30 adapted to straddle the bar 21 when the two parts of the gauging device are assembled upon each other and these flanges provide therebetween a guideway 31 in which the bar 21 is slidable. The height of the flanges 30 is substantially equal to the thickness of the bar 21 so that the upper ends of the flanges lie substantially flush with the upper surface of this latter bar.

In order to fasten the bars 21 and 26 together in varying positions of axial adjustment, a locking screw 32 having a knurled head 33 extends through the slot 22 in the bar 21 and has a shank providing a cylindrical portion 34 of a diameter to fit snugly between the sides of the slot and a threaded end 35 which is received in the threaded opening 27. The underneath side of the head 33 provides a shoulder 36 designed for clamping engagement with the edge regions of the slot 22 when the locking screw 32 is in its tightened position.

As shown in Fig. 1, the upper edge of one of the side flanges 30 on the bar 26 is provided with an indicia mark 36 designed for selective register with reference marks 37 provided along an edge of the bar 21 and suitable legending 38 representing the various vehicle models as to year, make, etc. may be stamped in the metal of the bar 21 alongside the reference marks 37 to which they pertain.

In the operation of the gauging device of Figs. 1 to 3 inclusive, as shown in Fig. 4, the indicia mark 36 is brought into register with the proper reference mark 38 for the particular transmission installation the throttle linkage system of which is to be installed or adjusted. The locking screw 32 is then tightened and the device will then have the proper effective gauging length for use with the transmission. The hole or opening 29 in the bar 26 is inserted over the head of the cover plate stud 12a, around which it fits snugly, and either side section of the pin 22 at the end of the bar 21 (whichever is more convenient) is projected through the hole or opening 16 formed at the free end of the throttle lever 14, the latter of course being previously loosened from the throttle valve rock-shaft so that the hole 16 may be brought into register with the pin 22. Thereafter the fastening screw 15 is tightened so that the throttle lever will assume a fixed position on the rock-shaft on which it is mounted.

The convenience of manipulation of the gauging device 20 is illustrated in Fig. 4 wherein the device is shown as being supported in its operative position by the hand of the installation mechanic. After the opening 29 in the end of the bar 26 has been inserted over the bolt head 12a, the free end of the device may be supported by the forefinger and thumb while a tool such as the tightening wrench shown at 40 (which forms no part of the present invention) may conveniently be grasped in the palm of the hand, ready for instant application to the fastening stud 15 as soon as the pin 22 has been inserted through the opening 16 in the bar 21.

In the form of the invention shown in Figs. 5 to 11 inclusive, the gauging mechanism is designed for use in connection with an automatic transmission shown in dotted lines at 100 and of a type wherein one edge 101 and its adjacent plane machined side surface of the transmission casing bolting flange 102 is selected for reference purposes. This mechanism is designated in its entirety at 103 and includes two main parts 104 and 105 respectively. The part 104 is in the form of an L-shaped bar having a relatively long leg 106 and a relatively short laterally turned leg 107, the latter being provided with an opening 108 therethrough. The leg 106 is provided with a series of locating holes 110 therein the function of which will be set forth presently. The part 105 is best illustrated in Fig. 6 and is in the form of a bar having an elongated leg portion 111 and a laterally extending portion 112 which is offset slightly as at 113 from the plane of the leg portion 111. The portion 112 is provided with a straight reference edge 114 which extends substantially normal to the longitudinal axis of the leg portion 111.

The leg 111 of the part 104 is provided with an elongated longitudinal slot 115 and a clamping stud 116 having a head 117 and a shank providing a cylindrical portion 118 and a threaded portion 119 extends through the opening 108 and slot 115 and carries a wing nut 120 and washer 121 by means of which the two parts 104 and 105 may be clamped together in any desired position of adjustment. The leg 107 is provided with a pair of spaced lugs or upstanding bosses 122 spaced on either side of the clamping stud 116 in axial alignment therewith along the leg 107, these bosses being adapted to project into the slot 115 when the parts are assembled to maintain axial alignment between the legs 107 and 111. The washer 121 is formed with a pair of laterally turned ears 123 (Fig. 8) which project into the slot 115 and serve to locate the washer in a fixed angular position so that a pointer 124 formed thereon may be brought selectively into register with a series of indicia marks stamped or otherwise formed on the face of the leg 111.

The series of holes 110 formed in the leg 106 of the part 104 may be identified by suitable indicia marks 125 which, for convenience, have been shown as code letters of the alphabet. Where space limitations permit, the make and yearly model of the vehicle in which the various transmissions are installed may be stamped on the face of the leg 106 in place of the code letters. The indicia marks 125 on the leg 111 of the part 105 represent adjustments which may be made between the two parts 104 and 105 to accommodate varying distances which may exist between the respective planes of the locating flange 102 and the throttle lever 127 of the transmission 100.

The operation of the form of the invention shown in Figs. 5 to 11 inclusive is somewhat similar to the operation of the previously described form shown in Figs. 1 to 4 inclusive. The gauging mechanism may be employed for the purpose of checking the rearmost position of the throttle lever 127 during installation or adjustment of the linkage system therefor. After the necessary adjustments have been effected to accommodate the particular installation undergoing adjustment or assembly, the reference edge 114 of the part 104 is positioned on the machined surface of the transmission casing flange in juxtaposition to the edge 101 as clearly shown in Fig. 11 and the opening 128 formed in the end of the throttle lever 127 may be checked with the position of the selected opening 110 provided in the leg 106 of the part 104, utilizing a suitable pin 129 for this purpose.

The invention is not to be limited to the exact arrangement of parts shown in the accompanying drawings or described in this specification as various changes in the details of construction may be resorted to without departing from the spirit of the invention. Only insofar as the invention has particularly been pointed out in the accompanying claims is the same to be limited.

What is claimed is:

1. In a linkage gauge for the throttle valve linkage systems of automatic automotive transmissions including a casing and a throttle valve lever having an opening formed in the free swinging end thereof, in combination, an extensible gauge bar assembly comprised of a pair of elongated bars adjustably slidable one upon the other to vary the effective length of the gauge bar assembly, cooperating guide means on said bars for maintaining the same in substantial axial alignment, and means for releasably clamping said bars together in a desired adjusted position, the free end of one of said bars being provided with a laterally offset portion, and means on said offset portion establishing a reference region for registry with a cooperating fixed reference region on the transmission casing, there being an opening in the other bar designed for registry with the opening in said throttle valve lever when said reference regions are in register and when the lever is in its correct position of orientation with respect to said transmission casing.

2. In a linkage gauge for automatic transmissions, the combination set forth in claim 1 including a locating pin secured in said last mentioned opening.

3. In a linkage gauge for the throttle valve linkage systems of automatic automotive transmissions including a casing and a throttle valve lever having an opening formed in the free swinging end thereof, in combination, an extensible gauge bar assembly comprised of a pair of elongated bars adjustable one upon the other to vary the effective length of the gauge bar assembly, a pair of upstanding flanges on one of said bars between which the other bar extends in sliding relation to and in axial alignment with said one bar, and means for releasably clamping said bars together in a desired adjusted position, the free end of one of said bars being provided with a laterally offset portion, and means on said offset portion establishing a reference region for registry with a cooperating fixed reference region on the transmission casing, there being an opening in the other bar designed for registry with the opening in said throttle valve lever when said reference regions are in register and when the lever is in its correct position of orientation with respect to said transmission casing.

4. In a linkage gauge for the throttle valve linkage systems of automatic automotive transmissions including a casing and a throttle valve lever having an opening formed in the free swinging end thereof, in combination, an extensible gauge bar assembly comprised of a pair of elongated bars adjustably slidable one upon the other to vary the effective length of the gauge bar assembly, there being an elongated axially extending slot in one of said bars, guide means on said other bar and extending into said slot for maintaining said bars in axial alignment in any desired position of adjustment therebetween, and means for releasably clamping said bars together in a desired adjusted position, the free end of one of said bars being provided with a laterally offset portion, and means on said offset portion establishing a reference region for registry with a cooperating fixed reference region on the transmission casing, there being an opening in the other bar designed for registry with the opening in said throttle valve lever when said reference regions are in register and when the lever is in its correct position of orientation with respect to said transmission casing.

5. In a linkage gauge for automatic transmissions, the combination set forth in claim 4 wherein said releasable clamping means comprises a clamping bolt projecting through said other bar and extending through said slot and having means thereon engageable with the edge regions of said slot.

6. In a linkage gauge for the throttle valve linkage systems of automatic automotive transmissions including a casing and a throttle valve lever having an opening formed in the free swinging end thereof, in combination, an extensible gauge bar assembly comprised of a pair of elongated bars adjustably slidable one upon the other to vary the effective length of the gauge bar assembly, and a pair of upstanding flanges on one of said bars between which the other bar extends in sliding relation to and in axial alignment with said one bar, there being an axially extending elongated slot in said other bar, a clamping screw projecting through said slot and having its end threadedly received in said one bar, the free end of one of said bars being provided with a laterally offset portion, and means on said offset portion establishing a reference region for register with a cooperating fixed reference region on the transmission casing, there being an opening in the other bar designed for registry with the opening in said throttle valve lever when said reference regions are in register and when the lever is in its correct position of orientation with respect to said transmission casing.

7. In a linkage gauge for the throttle valve linkage systems of automatic automotive transmissions including a casing and a throttle valve lever having an opening formed in the free swinging end thereof, in combination, an extensible gauge bar assembly comprised of a pair of elongated bars adjustably slidable one upon the other to vary the effective length of the gauge bar assembly, cooperating guide means on said bars for maintaining the same in substantial axial alignment, and means for releasably clamping said bars together in a desired adjusted position, the free end of one of said bars being provided with a laterally offset portion, and means on said offset portion establishing a reference region for register with a cooperating fixed reference region on the transmission casing, there being a series of predeterminedly positioned openings in the other bar each of which has been positioned according to engineering exigencies to vary the effective length of the gauge bar assembly to accommodate varying distances between the opening in the throttle valve lever and the fixed reference region on the transmission casing for different transmissions, said bar openings being designed for selective registry with the opening in said throttle valve lever when said reference regions are in register and when the lever is in its correct position of orientation with respect to said transmission casing.

8. In a linkage gauge for the throttle valve linkage systems of automotive transmissions including a casing provided with a cover plate, a series of hexagonal headed studs securing said cover plate in position on the casing, and a throttle valve lever having an opening formed in the free end thereof, in combination, an extensible gauge bar assembly comprised of a pair of elongated bars adjustably slidable one upon the other to vary the effective length of the assembly, cooperating guide means on said bars for maintaining the same in substantial axial alignment, and means for releasably clamping said bars together in a desired adjusted position, the free end of one of said bars being provided with a laterally offset portion having an opening therein of a diameter substantially equal to the overall diameter of the head portion of one of said cover plate studs, there being a locating opening in the other bar designed for registry with the opening in said throttle valve lever when the opening in said offset portion is telescopically received over said head portion of the cover plate stud and when said lever is in its correct position of orientation with respect to the transmission casing.

9. In a linkage gauge for automatic transmissions, the combination set forth in claim 8 including a laterally projecting locating pin secured in said locating opening and designed for projection through the opening in said throttle valve lever when the latter is in its correct position.

10. In a linkage gauge for automatic transmissions, the combination set forth in claim 9 wherein said locating pin projects laterally from the opening in which it is mounted in opposite directions.

11. In a linkage gauge for the throttle valve linkage systems of automatic automotive transmissions including a casing and a throttle valve lever having an opening formed in the free swinging end thereof, in combination, an extensible gauge bar assembly comprised of a pair of elongated bars adjustably slidable one upon the other to vary the effective length of the gauge bar assembly, there being an elongated longitudinally extending slot formed in one of said bars, a pair of spaced lugs on the other bar projecting into said slot, said lugs each being of a width substantially equal to the width of said slot whereby said lugs serve to maintain the bars in axial alignment, clamping means extending through said other bar and through said slot for clamping the bars in a desired adjusted position, the free end of one of said bars being provided with a laterally offset portion, and means on said offset portion establishing a reference region for register with a cooperating fixed reference region on the transmission casing, there being a series of predeterminedly positioned openings in the other bar each of which has been positioned according to engineering exigencies to vary the effective length of the gauge bar assembly to accommodate varying distances between the opening in the throttle lever and the fixed reference region on the transmission casing for different transmissions, said openings being disigned for selective registry with the opening in said throttle valve lever when said reference regions are in register and when the lever is in its correct position of orientation with respect to the transmission casing.

12. In a linkage gauge for automatic transmissions, the combination set forth in claim 11 wherein said clamping means comprises a clamping bolt projecting through said other bar and through said slot, a washer overlying the edges of said slot and through which said bolt extends, and a nut threadedly received on said bolt and bearing against said washer for drawing the latter against the side regions of said slot.

13. In a linkage gauge for automatic transmissions, the combination set forth in claim 12 including a pair of lugs formed on said washer and extending into said slot to prevent turning movement of the washer about its central axis, a scale including indicia marks extending along the surface of said one bar in the vicinity of said slot, and a pointer on said washer designed for selective register with the indicia marks of said scale.

References Cited in the file of this patent

UNITED STATES PATENTS 606,851  Ware _____ July 5, 1898

(Other references on following page)

UNITED STATES PATENTS

| | | | |
|---|---|---|---|
| 627,112 | Gross | June 20 | 1899 |
| 1,007,937 | Garinger | Nov. 7, | 1911 |
| 1,019,936 | Ware | Mar. 12, | 1912 |
| 1,514,452 | Frederickson et al. | Nov. 4, | 1924 |
| 1,551,671 | Kaufmann | Sept. 1, | 1925 |
| 1,981,751 | Passler | Nov. 20, | 1934 |
| 2,060,927 | Cristiani | Nov. 17, | 1936 |
| 2,326,412 | Taylor | Aug. 10, | 1943 |

FOREIGN PATENTS

| | | | |
|---|---|---|---|
| 905,581 | France | Apr. 23, | 1945 |
| 803,191 | Germany | Mar. 1, | 1951 |